Aug. 31, 1926.
R. E. OGDEN
PIPE HANGER
Filed Oct. 20, 1922
1,598,385
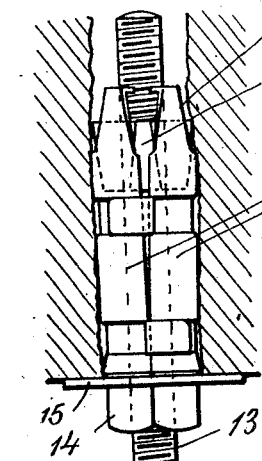
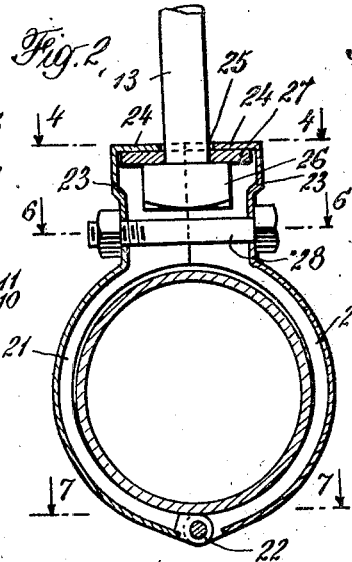
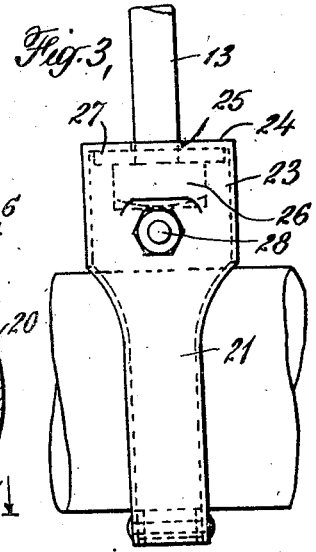
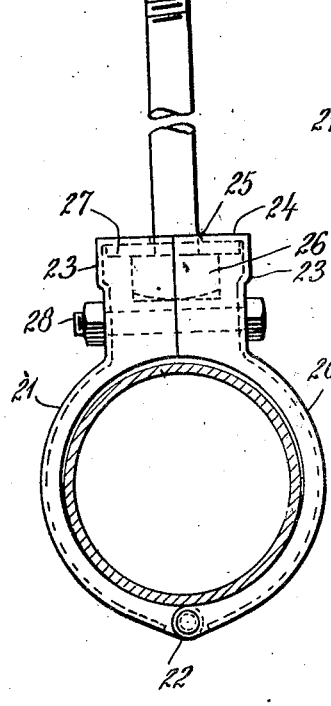
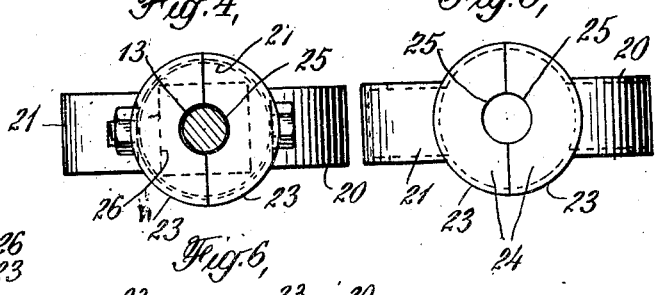
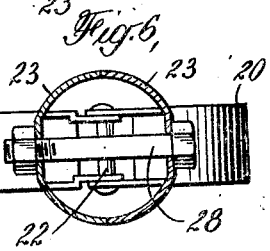
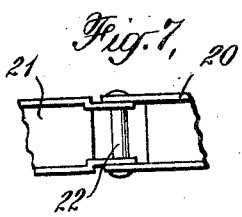
INVENTOR
Ralph Edward Ogden
BY
ATTORNEY Patented Aug. 31, 1926.

1,598,385

UNITED STATES PATENT OFFICE.

RALPH EDWARD OGDEN, OF MOUNTAINVILLE, NEW YORK, ASSIGNOR TO J. EDWARD OGDEN, OF MOUNTAINVILLE, NEW YORK.

PIPE HANGER.

Application filed October 20, 1922. Serial No. 595,867.

This invention relates to supports and particularly to supports of the type known as pipe hangers used for suspending over-head pipe lines.

One of the objects of the invention is to provide a simple, practical and inexpensive pipe hanger having a swivel connection with the rod, bolt or other supporting arm on which it is mounted.

Another object of the invention is to provide means for suspending a pipe from a wall or ceiling including a threaded member locked in the wall or ceiling, a supporting member carried by the threaded member and a pipe hanger swivelly mounted on the supporting member.

Another object of the invention is to provide a pipe hanger so constructed and arranged that the carrier can be formed from sheet metal stampings.

Further objects of the invention will appear from the following description taken in connection with the drawings which form a part of this application and in which, Fig. 1 is an elevational view showing the means for securing the hanger support to a wall or ceiling and also showing the hanger carried by the support.

Fig. 2 is a sectional elevation of the hanger.

Fig. 3 is a side elevation of the construction shown in Fig. 2.

Fig. 4 is a transverse sectional elevation illustrating in top plan the hanger.

Fig. 5 is a top plan view of the hanger with the bolt upon which the hanger is supported omitted.

Fig. 6 is a transverse sectional elevation taken substantially on line 6—6 of Fig. 2, and Fig. 7 is a sectional elevation showing a hinged connection between the carrier straps and taken substantially on line 7—7 of Fig. 2.

The pipe hanger briefly described comprises a pair of straps adapted to support a pipe, these straps having pockets formed in their upper ends adapted to house and enclose the head of the bolt by which the carrier is supported and means is provided for clamping the carrier straps together over the head of the bolt and the ends of the straps are so constructed that the carrier is swiveled on the bolt head. This hanger is particularly adapted for use with an expansion shield so constructed that the threaded element of the shield into which the bolt is threaded is locked in the bore of a hole drilled in the wall. With such a structure the bolt or hanger supporting member may be adjusted at its upper end in the threaded element and no adjustment is necessary at the hanger. Further details of the invention will appear from the following description.

In Fig. 1 the hanger is illustrated in connection with an expansion shield comprising sections 10 and 11, these sections being engaged by an expanding nut 12. A bolt 13 is threaded into the nut 12 and carries the nut 14 located outside of the shield and a washer 15 intermediate the nut 14 and the outer end of the shield. The shield is expanded by rotating the nut 14 thereby drawing the bolt longitudinally through the shield and forcing the nut 12 into locking engagement wtih the bore of the wall opening. In this type of shield also longitudinally extending fingers 16 may be provided and these fingers upon the expansion of the shield assist in retaining the nut 12 in locked position therein. After the shield has been locked in the wall opening and the nut 12 has been locked in the shield and in the opening, the bolt 13 may be adjusted in the nut 12 after loosening the nut 14.

The pipe hanger comprises a carrier having a pair of straps 20 and 21 shown as hingedly connected at 22. These straps are preferably formed of sheet metal and are channeled in section. The end portions of the straps 20 and 21 are enlarged, forming semi-cylindrical pockets 23. At their ends beyond the semi-cylindrical portions the straps have inwardly extending flanges 24 each flange having a semi-circular opening 25 therein, the openings 25 registering and forming a central opening for receiving the shank of the bolt 13.

The head 26 of the bolt is positioned within the housing formed by the pockets 23 and end flanges 24 of the straps and if desired a washer 27 may be interposed between the head 26 and the strap end flanges 24.

The straps are secured or clamped together by any suitable means such as a bolt 28 which extends through the straps and is located below the head 26 of the bolt.

The hanger is used in the following manner. After the bolt 13 has been properly adjusted in the nut 12 and has been locked in adjustment by the nut 14, the carrier straps 20 and 21 are placed around the pipe and the head 26 of the bolt is enclosed between the cylindrical end portions of the straps. The bolt 28 is then passed through the carrier straps and clamps the straps in position.

It will thus be seen that simple, practical and inexpensive pipe hanger construction has been designed and that the hanger is well adapted to perform the desired functions.

Although one specific embodiment of the invention has been particularly shown and described, it will be understood that the invention is capable of modification and that changes in the construction and in the arrangement of the various cooperating parts may be made without departing from the spirit or scope of the invention as expressed in the following claim.

What I claim is:—

A pipe hanger comprising a pair of hingedly connected, sheet metal straps, channeled in section and having enlarged semi-cylindrical end portions provided with inwardly directed flanged ends, said ends having a central opening therethrough for receiving a bolt shank, and means for clamping said straps together.

In witness whereof, I have hereunto set my hand this 19th day of October, 1922.

RALPH EDWARD OGDEN.